US008416391B2

(12) United States Patent
Banine et al.

(10) Patent No.: US 8,416,391 B2

(45) Date of Patent: Apr. 9, 2013

(54) RADIATION SOURCE, LITHOGRAPHIC APPARATUS AND DEVICE MANUFACTURING METHOD

(75) Inventors: Vadim Yevgenyevich Banine, Deurne (NL); Maarten Marinus Johannes Wilhelmus Van Herpen, Heesch (NL); Wouter Anthon Soer, Nijmegen (NL)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 12/809,427

(22) PCT Filed: Dec. 19, 2008

(86) PCT No.: PCT/NL2008/050820

§ 371 (c)(1), (2), (4) Date: Jun. 18, 2010

(87) PCT Pub. No.: WO2009/078722

PCT Pub. Date: Jun. 25, 2009

(65) Prior Publication Data

US 2011/0134405 A1 Jun. 9, 2011

Related U.S. Application Data

(60) Provisional application No. 61/006,117, filed on Dec. 19, 2007.

(51) Int. Cl.

*G03B 27/54* (2006.01)
*G21G 4/00* (2006.01)

(52) U.S. Cl. ........................................ 355/67; 250/493.1

(58) Field of Classification Search .................... 355/67, 355/53; 250/504

See application file for complete search history.

(56) References Cited

U.S. PATENT DOCUMENTS

| | | | | |
|---|---|---|---|---|
| 5,296,891 | A | 3/1994 | Vogt et al. | 355/67 |
| 5,523,193 | A | 6/1996 | Nelson | 430/311 |
| 2007/0040511 | A1 | 2/2007 | Ziener et al. | 315/111.21 |
| 2007/0085044 | A1 | 4/2007 | Hergenhan et al. | 250/504 R |
| 2007/0090304 | A1 | 4/2007 | Jonkers et al. | 250/504 R |

FOREIGN PATENT DOCUMENTS

| | | |
|---|---|---|
| WO | WO 98/33096 | 7/1998 |
| WO | WO 98/38597 | 9/1998 |

OTHER PUBLICATIONS

International Search Report as issued for PCT/NL2008/050820, dated Apr. 3, 2009.

*Primary Examiner* — Peter B Kim

(74) *Attorney, Agent, or Firm* — Pillsbury Winthrop Shaw Pittman LLP

(57) ABSTRACT

A radiation source is configured to generate radiation. The radiation source includes a first electrode and a second electrode configured to produce an electrical discharge during use to generate radiation-emitting plasma from a plasma fuel. The radiation source also includes a fuel supply configured to supply a plasma fuel to a fuel release area that is associated with the first electrode and the second electrode, and a fuel release configured to induce release of fuel, supplied by the fuel supply, from the fuel release area. The fuel release area is spaced-apart from the first electrode and from the second electrode.

16 Claims, 7 Drawing Sheets

RADIATION SOURCE, LITHOGRAPHIC APPARATUS AND DEVICE MANUFACTURING METHOD

CROSS-REFERENCE TO RELATED APPLICATIONS

This application is the U.S. national phase application of International Application No. PCT/NL2008/050820, which claims the benefit of priority of U.S. provisional application 61/006,117, which was filed on Dec. 19, 2007, and which is incorporated herein in its entirety by reference.

FIELD

The present invention relates to a radiation source and method, a lithographic apparatus and a method for manufacturing a device.

BACKGROUND

A lithographic apparatus is a machine that applies a desired pattern onto a substrate, usually onto a target portion of the substrate. A lithographic apparatus can be used, for example, in the manufacture of integrated circuits (ICs). In that instance, a patterning device, which is alternatively referred to as a mask or a reticle, may be used to generate a circuit pattern to be formed on an individual layer of the IC. This pattern can be transferred onto a target portion (e.g. comprising part of, one, or several dies) on a substrate (e.g. a silicon wafer). Transfer of the pattern is typically via imaging onto a layer of radiation-sensitive material (resist) provided on the substrate. In general, a single substrate will contain a network of adjacent target portions that are successively patterned.

Lithography is widely recognized as one of the key steps in the manufacture of ICs and other devices and/or structures. However, as the dimensions of features made using lithography become smaller, lithography is becoming a more critical factor for enabling miniature IC or other devices and/or structures to be manufactured.

A theoretical estimate of the limits of pattern printing can be given by the Rayleigh criterion for resolution as shown in equation (1):

$$CD = k_1 * \frac{\lambda}{NA_{PS}} \quad (1)$$

where λ is the wavelength of the radiation used, $NA_{PS}$ is the numerical aperture of the projection system used to print the pattern, $k_1$ is a process dependent adjustment factor, also called the Rayleigh constant, and CD is the feature size (or critical dimension) of the printed feature. It follows from equation (1) that reduction of the minimum printable size of features can be obtained in three ways: by shortening the exposure wavelength λ, by increasing the numerical aperture $NA_{PS}$ or by decreasing the value of $k_1$.

In order to shorten the exposure wavelength and, thus, reduce the minimum printable size, it has been proposed to use an extreme ultraviolet (EUV) radiation source. EUV radiation sources are configured to output a radiation wavelength of about 13 nm. Thus, EUV radiation sources may constitute a significant step toward achieving small features printing. Such radiation is termed extreme ultraviolet or soft x-ray, and possible sources include, for example, laser-produced plasma sources, discharge plasma sources, or synchrotron radiation from electron storage rings.

In certain radiation sources, a pinch is located at/near one electrical discharge electrode. This may be a disadvantage for debris mitigation systems (such as position-sensitive foil traps) and self-shading electrodes.

SUMMARY

It is desirable to improve the radiation source. For example, in case of EUV lithography, the power radiated by an EUV radiation source depends on the source size. Generally, it is desirable to collect as much power radiated by the source as possible because a large collection efficiency of the radiated power means that the power provided to the source can be reduced, which will be beneficial to the lifetime of the source. The source size together with the collection angle form the etendue of the source. Only radiation emitted within the etendue of the source may be taken into account and used for illuminating the patterning device.

According to an embodiment, there is provided a radiation source configured to generate radiation. The radiation source includes a first electrode and a second electrode configured to produce an electrical discharge during use to generate radiation-emitting plasma from a plasma fuel. The radiation source also includes a fuel supply configured to supply a plasma fuel to a fuel release area that is associated with the first electrode and the second electrode. The radiation source further includes a fuel release configured to induce release of fuel, supplied by the fuel supply, from the fuel release area. The fuel release area is spaced-apart from the first electrode and from the second electrode, wherein the first electrode and the second electrode form anodes and the fuel supply is an electrical discharge cathode, wherein the first electrode and the second electrode form cathodes and the fuel supply is an electrical discharge anode, or wherein the fuel supply is not part of the first electrode or the second electrode.

The fuel supply may be a rotating wheel, or is a rotationally symmetrical or cylindrical fuel supplying unit, or is connected to a high voltage electrical power source, or any combination thereof.

According to an embodiment, there is provided a radiation source configured to generate radiation. The radiation source includes a fuel evaporation system configured to generate an evaporated plasma fuel. The radiation source also includes a first rotatable electrode and a second rotatable electrode configured to produce an electrical discharge there-between, during use, to generate radiation-emitting plasma from the evaporated plasma fuel. The radiation source further includes a cooling medium reservoir that includes cooling medium configured to cool the first rotatable electrode and the second rotatable electrode.

The evaporation system may be provided with a fuel droplet generator or a fuel jet generator. The fuel evaporating system may be provided with a fuel supply. The source may include a drive configured to rotate the fuel supply. The fuel supply may be constructed and arranged to transport fuel from a fuel reservoir to an evaporation area by way of rotation of the fuel supply, the fuel evaporating system being configured to evaporate the plasma fuel at the evaporation area. The source may include a cooling bath configured to cool the first rotatable electrode and/or the second electrode.

According to an embodiment, there is provided a method to generate radiation. The method includes providing at least a first electrode and a second electrode, and transporting fuel to a fuel release area that is spaced-apart from the first electrode and the second electrode with a fuel supply. The method also includes inducing release of the fuel from the fuel release area towards an electrical discharge path associated with the first electrode and the second electrode. The method further includes generating an electrical discharge to generate radiation-emitting plasma from fuel that has been released from the fuel release area. The fuel supply may be a third electrode, wherein electrical discharges are evoked between each of the first and second electrode on one hand and the third electrode on the other hand.

According to an embodiment, there is provided a method to generate radiation. The method includes providing a first movable or rotatable electrode and a second movable or rotatable electrode, rotating or moving each electrode through a heat removing medium, and evaporating a plasma fuel near the electrodes. The method also includes generating an electrical discharge between the electrodes to generate radiation-emitting plasma from evaporated plasma fuel. The evaporating may include generating fuel droplets or a fuel jet, and irradiating the generated droplets or jet with a laser beam.

According to an embodiment, there is provided a device manufacturing method that includes generating a beam of radiation, patterning the beam of radiation to form a patterned beam of radiation, and projecting the patterned beam of radiation onto a substrate. Generating the beam of radiation includes providing at least a first electrode and a second electrode, transporting fuel to a fuel release area that is spaced-apart from the first electrode and the second electrode with a fuel supply, inducing release of the fuel from the fuel release area towards an electrical discharge path associated with the first electrode and the second electrode, and generating an electrical discharge to generate radiation-emitting plasma from fuel that has been released from the fuel release area.

According to an embodiment, there is provided a device manufacturing method that includes generating a beam of radiation, patterning the beam of radiation to form a patterned beam of radiation; and projecting the patterned beam of radiation onto a substrate. Generating the beam of radiation includes providing a first movable or rotatable electrode and a second movable or rotatable electrode, rotating or moving each electrode through a heat removing medium, evaporating a plasma fuel near the electrodes, and generating an electrical discharge between the electrodes to generate radiation-emitting plasma from evaporated plasma fuel.

According to an embodiment, there is provided a lithographic apparatus that includes a radiation source configured to generate radiation. The radiation source includes a first electrode and a second electrode configured to produce an electrical discharge during use to generate radiation-emitting plasma from a plasma fuel, a fuel supply configured to supply a plasma fuel to a fuel release area that is associated with the first electrode and the second electrode, and a fuel release configured to induce release of fuel, supplied by the fuel supply, from the fuel release area. The fuel release area is spaced-apart from the first electrode and from the second electrode. The lithographic apparatus also includes a patterning device configured to pattern the radiation, and a projection system configured to project the patterned radiation onto a target portion of a substrate.

According to an embodiment, there is provided a lithographic apparatus that includes a radiation source configured to generate radiation. The radiation source includes a fuel evaporation system configured to generate an evaporated plasma fuel, a first rotatable electrode and a second rotatable electrode configured to produce an electrical discharge therebetween, during use, to generate radiation-emitting plasma from the evaporated plasma fuel, and a cooling medium reservoir comprising cooling medium configured to cool the first rotatable electrode and the second rotatable electrode. The lithographic apparatus also includes a patterning device configured to pattern the radiation, and a projection system configured to project the patterned radiation onto a target portion of a substrate.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
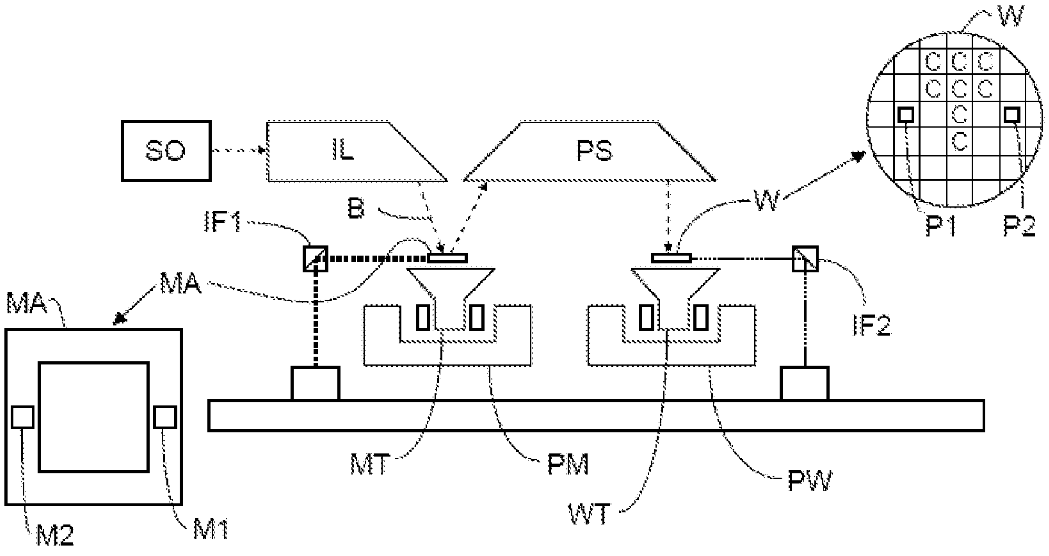
FIG. 1 depicts a lithographic apparatus according to an embodiment of the invention.

FIG. 1 schematically depicts a lithographic apparatus according to one non-limiting embodiment of the invention. The apparatus comprises: an illumination system (illuminator) IL configured to condition a radiation beam B (e.g. EUV radiation); a support structure (e.g. a mask table) MT constructed to support a patterning device (e.g. a mask or a reticle) MA and connected to a first positioner PM configured to accurately position the patterning device; a substrate table (e.g. a wafer table) WT constructed to hold a substrate (e.g. a resist-coated wafer) W and connected to a second positioner PW configured to accurately position the substrate; and a projection system (e.g. a reflective projection lens system) PS configured to project a pattern imparted to the radiation beam B by patterning device MA onto a target portion C (e.g. comprising one or more dies) of the substrate W.

The illumination system may include various types of optical components, such as refractive, reflective, magnetic, electromagnetic, electrostatic or other types of optical components, or any combination thereof, for directing, shaping, or controlling radiation.

The support structure holds the patterning device in a manner that depends on the orientation of the patterning device, the design of the lithographic apparatus, and other conditions, such as for example whether or not the patterning device is held in a vacuum environment. The support structure can use mechanical, vacuum, electrostatic or other clamping techniques to hold the patterning device. The support structure may be a frame or a table, for example, which may be fixed or movable as required. The support structure may ensure that the patterning device is at a desired position, for example with respect to the projection system.

The term "patterning device" should be broadly interpreted as referring to any device that can be used to impart a radiation beam with a pattern in its cross-section such as to create a pattern in a target portion of the substrate. The pattern imparted to the radiation beam may correspond to a particular functional layer in a device being created in the target portion, such as an integrated circuit.

The patterning device may be transmissive or reflective. Examples of patterning devices include masks, programmable mirror arrays, and programmable LCD panels. Masks are well known in lithography, and include mask types such as binary, alternating phase-shift, and attenuated phase-shift, as well as various hybrid mask types. An example of a programmable mirror array employs a matrix arrangement of small mirrors, each of which can be individually tilted so as to reflect an incoming radiation beam in different directions. The tilted mirrors impart a pattern in a radiation beam which is reflected by the mirror matrix.

The term "projection system" may encompass any type of projection system, including refractive, reflective, catadioptric, magnetic, electromagnetic and electrostatic optical systems, or any combination thereof, as appropriate for the exposure radiation being used, or for other factors such as the use of an immersion liquid or the use of a vacuum. It may be desired to use a vacuum for EUV or electron beam radiation since other gases may absorb too much radiation or electrons. A vacuum environment may therefore be provided to the whole beam path with the aid of a vacuum wall and vacuum pumps.

As here depicted, the apparatus is of a reflective type (e.g. employing a reflective mask). Alternatively, the apparatus may be of a transmissive type (e.g. employing a transmissive mask).

The lithographic apparatus may be of a type having two (dual stage) or more substrate tables (and/or two or more mask tables). In such "multiple stage" machines the additional tables may be used in parallel, or preparatory steps may be carried out on one or more tables while one or more other tables are being used for exposure.

Referring to FIG. 1, the illuminator IL receives a radiation beam from a radiation source SO. The source and the lithographic apparatus may be separate entities, for example when the source is an excimer laser. In such cases, the source is not considered to form part of the lithographic apparatus and the radiation beam is passed from the source SO to the illuminator IL with the aid of a beam delivery system comprising, for example, suitable directing mirrors and/or a beam expander. In other cases the source may be an integral part of the lithographic apparatus, for example when the source is a mercury lamp. The source SO and the illuminator IL, together with the beam delivery system if required, may be referred to as a radiation system.

The illuminator IL may comprise an adjuster for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may comprise various other components, such as an integrator and a condenser. The illuminator may be used to condition the radiation beam, to have a desired uniformity and intensity distribution in its cross-section.

The radiation beam B is incident on the patterning device (e.g., mask) MA, which is held on the support structure (e.g., mask table) MT, and is patterned by the patterning device. After being reflected from the patterning device (e.g. mask) MA, the radiation beam B passes through the projection system PS, which focuses the beam onto a target portion C of the substrate W. With the aid of the second positioner PW and position sensor IF2 (e.g. an interferometric device, linear encoder or capacitive sensor), the substrate table WT can be moved accurately, e.g. so as to position different target portions C in the path of the radiation beam B. Similarly, the first positioner PM and another position sensor IF1 can be used to accurately position the patterning device (e.g. mask) MA with respect to the path of the radiation beam B. Patterning device (e.g. mask) MA and substrate W may be aligned using mask alignment marks M1, M2 and substrate alignment marks P1, P2.

The depicted apparatus could be used in at least one of the following modes:

1. In step mode, the support structure (e.g. mask table) MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed.

2. In scan mode, the support structure (e.g. mask table) MT and the substrate table WT are scanned synchronously while a pattern imparted to the radiation beam is projected onto a target portion C (i.e. a single dynamic exposure). The velocity and direction of the substrate table WT relative to the support structure (e.g. mask table) MT may be determined by the (de-)magnification and image reversal characteristics of the projection system PS.

3. In another mode, the support structure (e.g. mask table) MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Combinations and/or variations on the above described modes of use or entirely different modes of use may also be employed.

Figure 2:
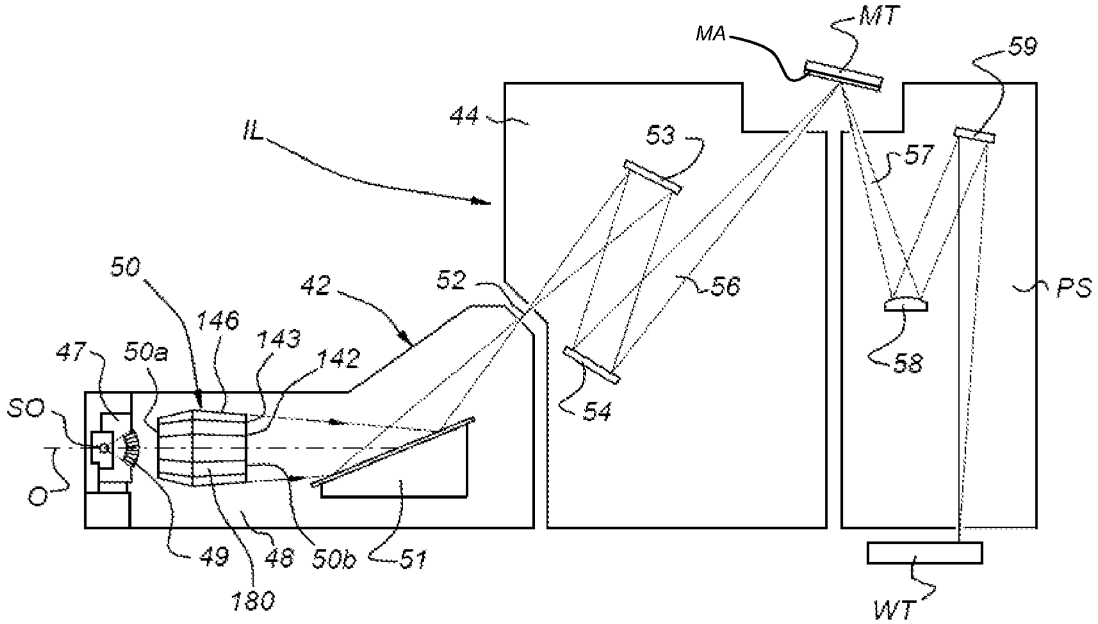
FIG. 2 schematically depicts a side view of an EUV illumination system and projection optics of a lithographic projection apparatus according to FIG. 1.

FIG. 2 shows the projection apparatus in more detail, including a radiation system 42, an illumination optics unit 44, and the projection system PS. The radiation system 42 includes the radiation source SO which may be formed by a discharge plasma. EUV radiation may be produced by a gas or vapor, for example Xe gas, Li vapor or Sn vapor in which a very hot plasma is created to emit radiation in the EUV range of the electromagnetic spectrum. The very hot plasma is created by causing an at least partially ionized plasma by, for example, an electrical discharge. Partial pressures of, for example, 10 Pa of Xe, Li, Sn vapor or any other suitable gas or vapor may be required for efficient generation of the radiation. The radiation emitted by radiation source SO is passed from a source chamber 47 into a collector chamber 48 via a gas barrier or contaminant trap (for example foil trap) 49 which is positioned in or behind an opening in source chamber 47. The contaminant trap 49 may include a channel structure. The contaminant trap 49 may also include a gas barrier or a combination of a gas barrier and a channel structure. In an embodiment, as discussed in FIG. 3, a tin (Sn) source is applied as an EUV source.

The collector chamber 48 includes a radiation collector 50 which may be formed by a grazing incidence collector. Radiation collector 50 has an upstream radiation collector side 50*a* and a downstream radiation collector side 50*b*. The radiation collector 50 includes reflectors 142, 143 and outer reflector 146, as shown in FIG. 2. Radiation passed by collector 50 can be reflected off a grating spectral filter 51 to be focused in a virtual source point 52 at an aperture in the collector chamber 48. From collector chamber 48, a beam of radiation 56 is reflected in illumination optics unit 44 via normal incidence reflectors 53, 54 onto the patterning device MA positioned on the support MT. A patterned beam 57 is formed which is imaged in projection system PS via reflective elements 58, 59 onto substrate table WT. More elements than shown may generally be present in illumination optics unit 44 and projection system PS. Grating spectral filter 51 may optionally be present, depending upon the type of lithographic apparatus. Further, there may be more mirrors present than those shown in FIG. 2, for example there may be 1-4 more reflective elements present than reflective elements 58, 59.

It should be appreciated that radiation collector 50 may have further features on the external surface of outer reflector 146 or further features around outer reflector 146, for example a protective holder, a heater, etc. Reference number 180 indicates a space between two reflectors, e.g. between reflectors 142 and 143. Each reflector 142, 143, 146 may comprise at least two adjacent reflecting surfaces, the reflecting surfaces further from the source SO being placed at smaller angles to the optical axis O than the reflecting surface that is closer to the source SO. In this way, a grazing incidence collector 50 is configured to generate a beam of (E)UV radiation propagating along the optical axis O.

Instead of using a grazing incidence mirror as collector mirror 50, a normal incidence collector may be applied. Collector mirror 50, as described herein in an embodiment in more detail as nested collector with reflectors 142, 143, and 146, and as schematically depicted in, amongst others, FIG. 2, is herein further used as example of a collector (or collector mirror). Hence, where applicable, collector mirror 50 as grazing incidence collector may also be interpreted as collector in general and in a specific embodiment also as normal incidence collector.

Further, instead of a grating 51, as schematically depicted in FIG. 2, a transmissive optical filter may be applied. Optical filters transmissive for EUV and less transmissive for or even substantially absorbing UV radiation are known in the art. Hence, “grating spectral purity filter” is herein further indicated as “spectral purity filter,” which includes gratings or transmissive filters. Not depicted in FIG. 2, but also included as optional optical element may be EUV transmissive optical filters, for instance arranged upstream of collector mirror 50, or optical EUV transmissive filters in illumination unit 44 and/or projection system PS.

As will be appreciated, the contaminant trap 49, and/or radiation collector 50 and/or the spectral purity filter 51 may be part of the illumination optics 44. Similarly, the reflective elements 53 and 54 may be part of the radiation system 42.

In the embodiment of the FIGS. 1 and 2, the lithographic apparatus 1 is a maskless apparatus in which the patterning device MA is a programmable mirror array. One example of such an array is a matrix-addressable surface having a viscoelastic control layer and a reflective surface. The basic principle behind such an apparatus is that, for example, addressed areas of the reflective surface reflect incident radiation as diffracted radiation, whereas unaddressed areas reflect incident radiation as undiffracted radiation. Using an appropriate filter, the undiffracted radiation can be filtered out of the reflected beam, leaving only the diffracted radiation behind. In this manner, the beam becomes patterned according to the addressing pattern of the matrix addressable surface. An alternative embodiment of a programmable mirror array employs a matrix arrangement of tiny mirrors, each of which can be individually tilted about an axis by applying a suitable localized electric field, or by employing piezoelectric actuators. Once again, the mirrors are matrix addressable, such that addressed mirrors will reflect an incoming radiation beam in a different direction to unaddressed mirrors. In this manner, the reflected beam is patterned according to the addressing pattern of the matrix-addressable mirrors. The required matrix addressing can be performed using suitable electronics. In both of the situations described hereabove, the patterning device can comprise one or more programmable mirror arrays. More information on mirror arrays as here referred to can be seen, for example, from U.S. Pat. Nos. 5,296,891 and 5,523,193, and PCT Publication Nos. WO 98/38597 and WO 98/33096. In the case of a programmable mirror array, the support structure may be embodied as a frame or table, for example, which may be fixed or movable as required.

The size(s) of the mirrors in a programmable mirror array is/are generally larger than the critical dimension of a pattern present on a conventional (reflective or transmissive) mask. As such, maskless lithographic apparatus generally requires a projection lens that has a higher de-multiplication factor than that of a non-maskless apparatus. For example, the de-multiplication factor of maskless lithographic apparatus is about 100, whereas the de-multiplication factor of non-maskless lithographic apparatus is about 4. Therefore, for a given numerical aperture of the projection system, the patterned radiation beam collected by the projection system PS in a maskless apparatus is much smaller than that of a lithographic apparatus using a conventional (reflective or transmissive) mask. This, in turn, limits the etendue of the maskless apparatus.

Existing EUV sources SO that are developed for conventional patterning device applications may have a source etendue that is significantly larger than that of a maskless lithographic apparatus. If the etendue of the source is larger than the etendue of the lithographic apparatus, radiation may be lost. As a result, the exposure time of each substrate may be longer. This may affect substrate throughput.

Due to the small etendue of a maskless apparatus, it is therefore desirable that all the radiations emitted by the plasma radiation source SO be collected by the lithographic apparatus 1 to limit radiation loss. In order to ensure that substantially all the radiation emitted by the source SO illuminates the patterning device MA and is collected by the projection system PS, it is desirable to match the etendue of the source SO with that of the lithographic apparatus 1. For example, in the embodiments of FIGS. 1 and 2, it is desirable to limit the etendue of the source in a range lower than about 0.03 $mm^2$ steradian.

Figure 3:
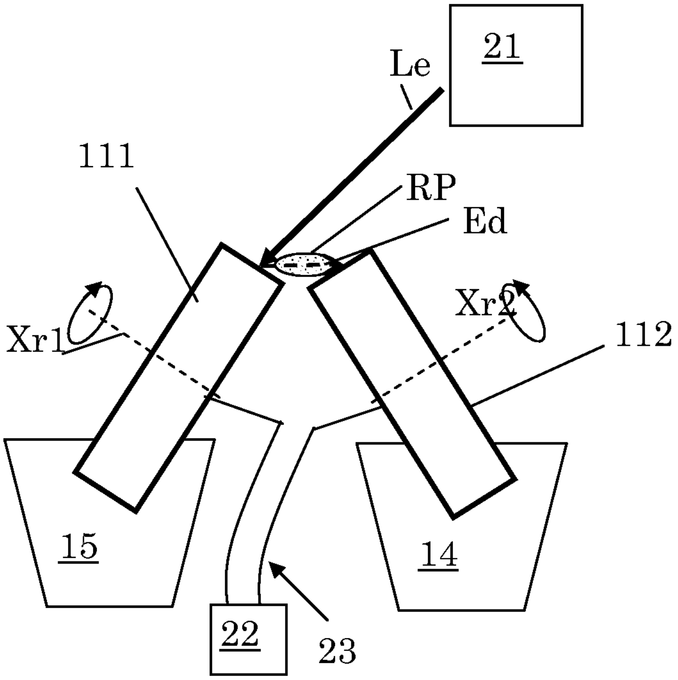
FIG. 3 schematically depicts an embodiment of a radiation source.

FIG. 3 schematically shows a radiation source configured to generate radiation. For example, the source can be used as an above-mentioned source SO of a lithographic apparatus. The source can also be used in a field different from lithography. In the embodiment of FIG. 3, the source has a first rotating electrode 111 and a second rotating electrode 112. Rotation axes of the electrodes 111, 112 are indicated by dashed lines Xr1, Xr2, respectively. Lower parts of the electrodes 111, 112 extend into respective cooling baths 14, 15, to be cooled by cooling medium contained in the baths 14, 15. One of the baths 111 also functions as a plasma fuel reservoir (i.e., the respective cooling medium also serves as plasma fuel). For example the plasma fuel reservoir bath 14 can contain plasma fuel in a liquid state, for example liquid tin (Sn). For example, in the present application, a plasma fuel can be tin (Sn), xenon (Xe), lithium (Li), Gadolinium (Gd), Terbium (Tb) or any suitable compound or combination or alloy of such elements, or a different suitable fuel. During operation, the plasma fuel in respective bath 14 can wet the respective rotating electrode 111 (i.e., a layer of fuel sticks to an outer surface of the rotating electrode 111). The other bath 15 can contain the same material as the fuel bath 14, or a different material (particularly a liquid). The source is also provided with a high voltage electrical power source 22 that is connected to the electrodes 111, 112 via suitable high tension connecting lines 23, to induce electrical discharges Ed between the electrodes 111, 112. For example, the connection lines 23 can be in direct contact with the electrodes 111, 112 (for example via respective rotation axes, or via suitable low friction contacts), as in FIGS. 3-4. Alternatively, the connection lines 23 can be in indirect contact with the electrodes 111, 112, for example via the baths 14, 15 and particularly via a (cooling) medium contained in these baths 14, 15 (see also FIG. 5*a*) in case that medium is electrically conductive.

A fuel release 21, or fuel release inducer, is provided. The fuel release 21 is configured to induce evaporation of fuel, supplied by the fuel supplying electrode 111, from a fuel release area, to generate radiation-emitting plasma RP. In the present embodiment, the fuel release area is a part or section of the wetted surface of the rotating plasma fuel supplying electrode 111, which part is defined by the fuel release 21. Particularly, the fuel release can be a laser source that emits a laser beam Le to the wetted surface of the electrode 111 (thereby defining the fuel release area), to effect the release of the fuel from the area. For example, the laser beam Le can be sufficiently powerful to thermally dislodge at least part of fuel from the electrode 111. In this embodiment, the laser beam illuminated fuel release area is part of one of the electrodes 111. During operation, the electrodes 111, 112 are preferably located in a low pressure environment, for example a vacuum, so that released fuel can evaporate swiftly from the fuel release area, and such that electrical discharges can be generated between the electrodes using the release fuels. During operation of the source according to FIGS. 4*a*, 4*b*, fuel that is released from that area can reach the opposite rotating electrode 112, providing a current path between 0 the electrodes. The high tension between the electrodes 111, 112, provided by the power source 22, ignites an electrical discharge Ed (shown by a dashed line) between the electrodes 111, 112 via the current path, which discharge Ed generates an radiation-emitting plasma RP that emits radiation (for example EUV radiation in case the fuel is tin, or an other fuel suitable to emit EUV radiation). As is indicated in FIG. 3, in this embodiment, the plasma RP has an ellipsoid shape, which results in a relatively large etendue. The density of plasma in the FIG. 3 embodiment will not be symmetrical with respect to the electrodes during a discharge (i.e., plasma density will be higher near the fuel evaporating electrode 111 compared to plasma density near the other electrode 112).

Figure 7:
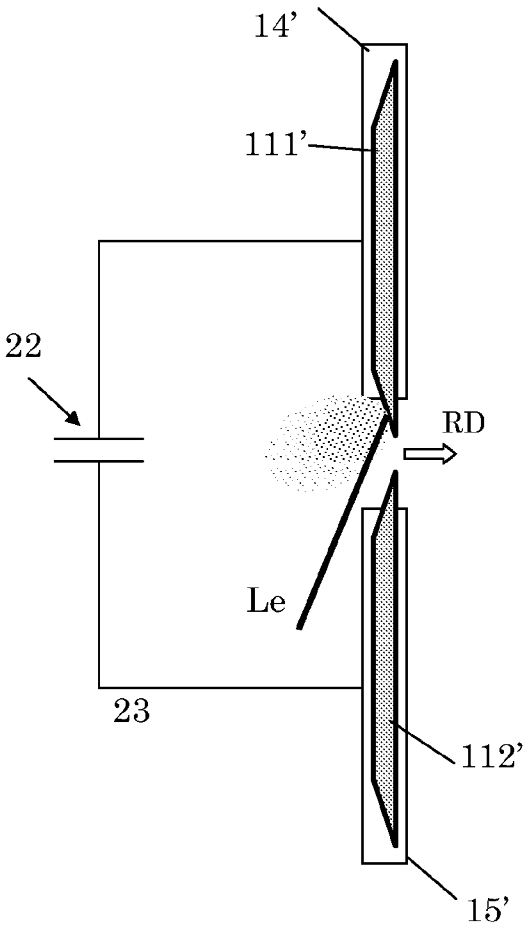
FIG. 7 schematically shows self-shading of an embodiment of a radiation source.

FIG. 7 depicts an embodiment that is similar to the FIG. 3 embodiment, and contains two rotating electrodes 111', 112' and respective baths 14', 15'; in this case, each electrode 111', 112' has a sharply inclined edge, each electrode 111', 112' being positioned vertically, and being in mutual alignment. In the embodiment of FIG. 7, the electrodes 111', 112' are "self-shading" for emission of ballistic debris from the electrode surface (with respect to a downstream part of a desired radiation emission path). In other words: the electrodes 111', 112' are arranged such that they physically block part of a debris emission path, in a general desired radiation emission direction RD (along the optical axis).

Particularly, in source design with rotating disk electrodes (see for example FIGS. 3, 7), the discharge is triggered by laser evaporation of liquid fuel (for example tin) from one of the electrodes (for example the cathode). This leads to a non-symmetrical distribution of the fuel plasma at the moment of the discharge, i.e. the plasma density is highest near the electrode 111, 111' where it was evaporated. As a result, the (for example EUV) pinch is not established halfway between the electrodes, but very close to the cathode. This short distance requires a very close spacing of foils of an optionally downstream contamination mitigation device 49, in order to resolve the pinch and the cathode. Another application where laser evaporation from the cathode 111, 111' is not optimal is the afore-mentioned self-shading electrodes. This is because the plasma expands in a direction perpendicular to the electrode surface, and this direction is not parallel to the discharge direction in the case of the self-shading electrodes. This limits the protection angle of the self-shading electrodes.

Figure 4A:
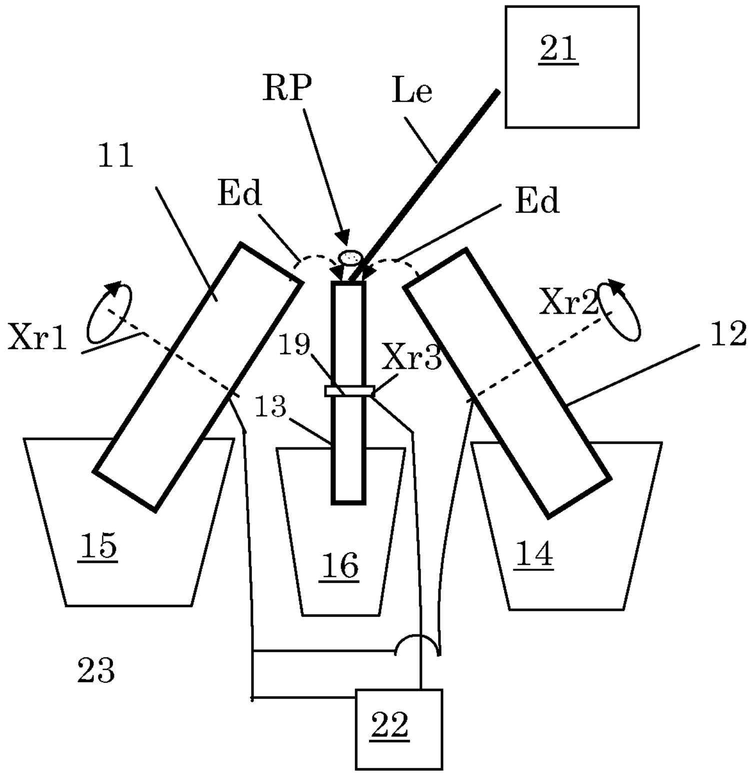
FIG. 4*a* schematically depicts an embodiment of a radiation source, in front view.
Figure 4B:
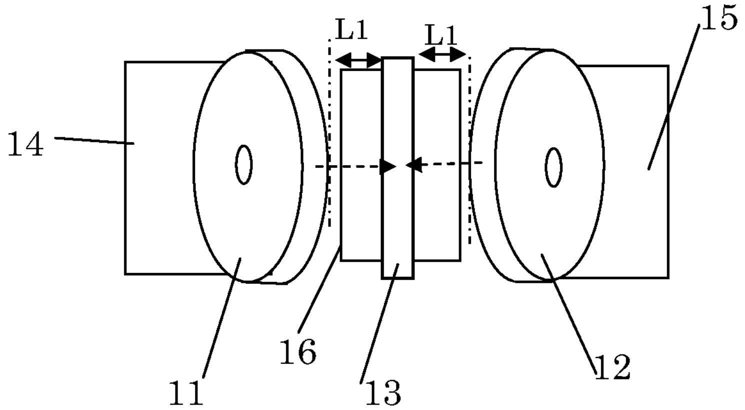
FIG. 4*b* depicts a top view of part of the embodiment of FIG. 4*a;*

FIGS. 4*a*, 4*b* schematically show an improved radiation source embodiment that can provide a relatively small etendue. Also, the embodiment according to FIGS. 4*a*, 4*b* can provide a more homogeneous plasma, or at least a plasma having a more symmetrically distributed density. The embodiment of FIGS. 4*a*, 4*b* differs from the embodiment of FIG. 3 in that the fuel release area is spaced-apart from each of the first and second rotating electrode 14, 15.

The embodiment of FIGS. 4*a*, 4*b* can provide a decreased source etendue, by providing a decreased the axial size of an EUV emitting region (i.e, the plasma RP) of the source. The adjusted (e.g. reduced) etendue of the plasma source can lead to a matching of the etendue of the source with the etendue of the lithographic apparatus 1.

In a further embodiment, the fuel supply 13 comprises or is part of a fuel transport system is that configured to transport fuel from a fuel reservoir to the fuel release area. Also, according to an embodiment, the radiation source can include one or more drive mechanisms 19 configured to rotate the fuel supply 13. In the embodiment of FIGS. 4*a*, 4*b*, particularly, the fuel supplying electrode 13 is not part of the at least first and second electrical discharge electrodes 11, 12.

Particularly, the embodiment of FIGS. 4*a*, 4*b* is provided with at least three rotating electrodes 11, 12, 13 (three, in the present embodiment), configured to produce electrical discharges Ed during use to generate radiation. In this case, two outer electrodes 11, 12 are provided, and one third electrode 13 that is located of extends between the outer electrodes 11, 12. Each of the electrodes 11, 12, 13 is a rotating electrode, which rotated about a respective axis of rotation Xr1, Xr2, Xr3 during operation. Drive means to drive (i.e. rotate) the electrodes 11, 12, 13 are not shown. Such drive means can be configured in various ways, and can include suitable bearings, motors that are directly or indirectly connected to the electrodes 11, 12, 13 (for example hub motors 19 that carry the respective electrode 13, or other motor types), transmissions, electrode carriers, and/or other suitable electrode rotation inducers, as will be appreciated by the skilled person. In an embodiment, the electrodes 11, 12, 13 can be interconnected to each other, such that a single drive unit can drive the electrodes 11, 12, 13 at the same time. The electrodes 11, 12, 13 can be driven independently from each other. In one embodiment, the electrodes 11, 12, 13 can have the same rotation speeds during operation. In an embodiment, for example, the rotation speed of the third electrode is higher or lower than a rotation speed of the outer electrodes 11, 12.

The electrodes 11, 12, 13 can each be configured and shaped in various ways. For example, each of the electrodes 11, 12, 13 can be a rotating wheel. Each of the electrodes 11, 12, 13 can be a rotationally symmetrical or cylindrical unit. Each electrode 11, 12, 13 can consist of or comprise electrically conductive material, for example one or more metals. Preferably, each electrode 11, 12, 13 is made of material that can operate under high thermal and electrical loads. The outer electrodes 11, 12 can be configured and shaped similar, or different with respect to each other. Also, the third (or inner) rotation electrode 13, can be configured and shaped similar, or different with respect to one or each of the outer electrodes 11, 12. In the present embodiment, for example, the inner electrode 13 has a smaller diameter than diameters of the outer electrodes 11, 12. Alternatively, the diameter of the inner electrode 13 can be the same as, or larger than, diameters of the outer electrodes 11, 12.

In an embodiment, for example, rotation axes of the electrodes can be parallel with respect to each other. In the present embodiment, however, the rotation axes Xr1, Xr2, Xr3 extend in different directions. Also, for example the rotation axes Xr1, Xr2, Xr3 can all extend in the same virtual vertical plane (as in the present embodiment), or in different virtual vertical planes. In the present embodiment, the outer electrodes 11, 12 are tilted with respect the third electrode 13, such that distances between lower ends of the electrodes are larger than distances between opposite (upper) electrical discharge ends of the electrodes 11, 12, 13. In the present embodiment, the third electrode 13 is arranged to position a respective fuel release area (see below) in a symmetrical relationship with respect of electrical discharge areas of the at least first and second electrode 11, 12. Particularly, to this aim, a (during operation fuel releasing) top of the third electrode 13 is separated by the same distance L1 from nearby tops of each of the outer electrodes 11, 12 (see FIG. 4*b*).

In the present embodiment, (lower) parts of the electrodes 11, 12, 13 extend into (i.e. dip into, make contact with) liquid that is contained in respective first baths 14, 15, and second bath 16. The second bath 16 relating to the third electrode 13 acts as a plasma fuel reservoir, i.e., the liquid contained in that bath 16 also serves as plasma fuel. For example the plasma fuel reservoir bath 16 can contain plasma fuel in a liquid state, for example liquid tin, or a different suitable fuel. For example, the laser 21 in combination with the third electrode 13 and fuel reservoir 16 can be called a "a fuel evaporating system 13, 16, 21", configured to generate evaporated plasma fuel. In an embodiment, a fuel evaporation system can be provided that does not include a fuel bath through which a fuel delivery unit 13 moves or rotates, for example in the case that the evaporation system is provided with a fuel droplet generator or a fuel jet generator (examples are described below, see FIG. 9).

During operation, the plasma fuel 16 can wet the respective rotating third electrode 13 (i.e., a layer of fuel sticks to an outer surface of the rotating electrode 13). The other (first) baths 14, 15 can contain the same material as the fuel bath 16, or a different material (particularly a liquid). In the present embodiment, three different baths 14, 15, 16 are associated with the three rotating electrodes 11, 12,13. Alternatively, for example a smaller number of baths can be provided, for example a single bath containing a medium, each of the electrodes 11, 12, 13 partly extending into that medium, or one plasma fuel reservoir 16 providing fuel to the third electrode 13, and one second reservoir containing a medium that contacts the outer electrodes 11, 12. In the present embodiment, the liquid contained in each of the baths 14, 15, 16 acts as a cooling medium for the respective rotating electrode 11, 12, 13. Also, the baths 14, 15, 16 can be provided with a cooling medium temperature conditioning system (not shown), for example a refrigerating system and/or a cooling medium recirculation system, to condition the temperature of the cooling medium contained in the baths, as will be appreciated by the skilled person.

The embodiment of FIGS. 4*a*, 4*b* is also provided with a high voltage electrical power source 22 that is connected to the electrodes 11, 12, 13 via suitable high tension connecting lines 23, to induce electrical discharges Ed between the outer electrodes 11, 12 and the third electrode 13, respectively. For example, the first and second electrodes 11, 12 can act as anodes, and the third electrode can act as a cathode, or vice-versa.

A fuel release 21, or fuel release inducer, such as a laser device, may be provided. The fuel release 21 may be configured to emit a laser beam Le to the wetted surface of the third electrode 13 (thereby defining the fuel release area from a respective fuel wetted outer surface of the electrode 13), to effect the release of the fuel from the area. During operation, the electrodes 11, 12, 13 may be located in a low pressure environment, for example a vacuum, so that released fuel can evaporate swiftly from the fuel release area, and electrical discharges can be generated between the electrodes using the release fuels.

Operation of the source of FIGS. 4*a*, 4*b* can be part of a lithographic device manufacturing method, but is not essential. Operation of the source can be a method to generate radiation, wherein the rotating fuel supply electrode 13 supplies fuel (from the reservoir 16) to a respective fuel release area that is spaced-apart from the first and second electrode 11, 12. The laser unit 21 induces release of the fuel from the fuel release area towards electrical discharge paths associated with the other electrodes 11, 12. Then, the electrical discharge Ed between the electrodes 11, 12, 13 generates radiation-emitting plasma RP from the released fuel. Particularly, electrical discharges are evoked between each of the first and second electrode 11, 12 on one hand and the third electrode 13 on the other hand. Also, during use, the electrodes 11, 12, 13 have been positioned relative to each other so that, in use, the discharge paths extending between the electrodes are substantially curved so as to create a force that compresses the radiation-emitting plasma RP. In an embodiment, at least part of each of the electrodes 11, 12, 13 is rotating or continuously moving through a heat removing medium, held by the respective bath 13, 14, 15.

For example, during operation of the source according to FIGS. 4*a*, 4*b*, all electrodes 11, 12, 13 rotate, and are cooled by cooling fuel (wetting the electrodes via the cooling baths 14, 15, 16). The third electrode 13 may act as a fuel transport device, to transport fuel from the respective bath 16 to the area (i.e. electrode top part, in the present embodiment) that can be illuminated by the laser 21. Upon laser illumination, fuel is released from the third rotating electrode 13. The fuel that is released by/from the third electrode 13 can reach the surfaces of nearby parts of the outer electrode 11, 12, thereby providing a plurality of current paths Ed there-between. The high tension between the electrodes 11, 12, 13, provided by the power source 22, ignites electrical discharges Ed (shown by the dashed lines) between the electrodes 11, 12, 13 via the current paths, which discharges Ed generate the radiation-emitting plasma RP that emits radiation (for example EUV radiation in case the fuel is tin, or an other fuel suitable to emit EUV radiation). Control of the radiation emission can be achieved for example by controlling the laser 21 and/or the power source 22. For example, the source can be operated to provide radiation continuously, semi-continuously, intermittently, in a pulse-like manner (a pulsed source) periodically, and or in a different manner, as will be appreciated by the skilled person.

As is indicated in FIG. 4*a*, in the present embodiment, the plasma RP has a reduced axial shape with respect to the shape shown in FIG. 3. It is believed that the embodiment of FIG. 4*a*, 4*b* can provide curved electrical paths for curved electrical discharges Ed (see FIG. 4*a*), leading to axial confinement of radiation-emitting plasma RP via electromagnetic interaction. Thus, a desired relatively small source etendue can be achieved.

Thus, the present embodiment can provide a field configuration that prevents a pinch propagation from one electrode to another. Also, according to a further embodiment, etendue can be matched so that relatively high amount of useful radiation power can be delivered for the same input (electrical) power, thereby increasing throughput, and decreasing heat load and infrastructure requirements.

Figure 5A:
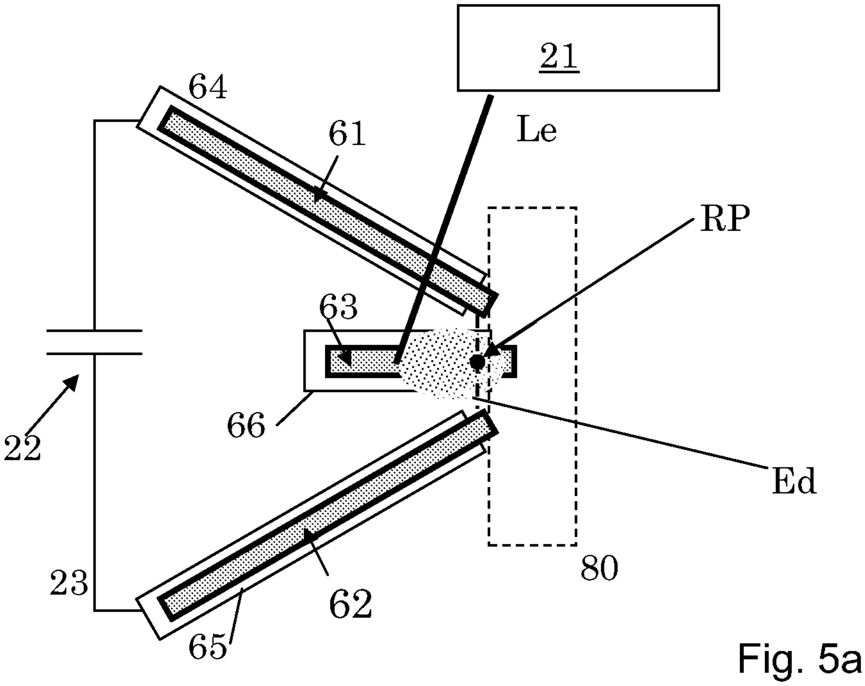
FIG. 5*a* schematically depicts a top view of an embodiment of a radiation source.
Figure 5B:
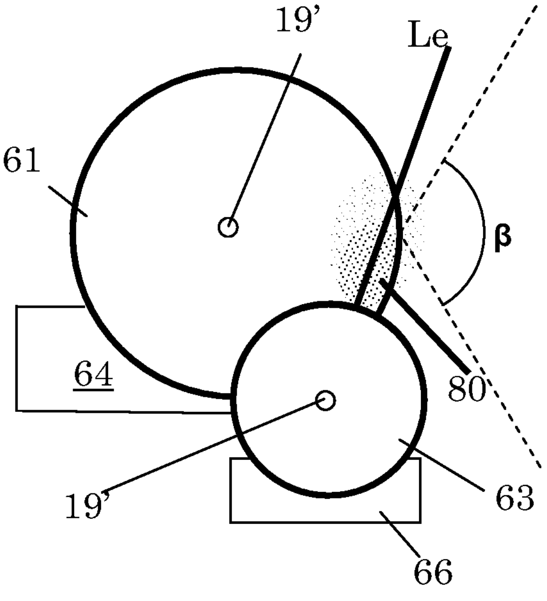
FIG. 5*b* schematically shows a side view of part of the embodiment of FIG. 5*a;*

FIGS. 5*a*, 5*b* show another non-limiting example of an embodiment of a radiation source. The source configuration of FIGS. 5*a*, 5*b* is substantially the same as the configuration of FIGS. 4*a*, 4*b*. A difference is, that the third rotating element (i.e. the fuel supply) 63 is not an electrode, or at least is not electrically connected to the high tension power source 22 during radiation emission operation. In the FIGS. 5*a*, 5*b* embodiment, the respective fuel release area, provided by supply unit 63 is also spaced-apart from each of the rotating first and second electrode 61, 62. Particularly, in this case, the fuel supply 63 is not part of the first and second electrical discharge electrodes 61, 62.

The embodiment of FIG. 5 may provide an improved radiation source embodiment that can provide a relatively large protection angle regarding the electrodes 61, 62 (see also FIGS. 8, 9), and a relatively symmetrical distribution of plasma with respect to the electrodes 61, 62.

The embodiment of FIGS. 5*a*, 5*b* is provided with at least three rotating units 61, 62, 63 (three, in the present embodiment), wherein the outer units 61, 62 are configured to produce electrical discharges Ed there-between during use to generate radiation. Drive means to drive (i.e. rotate) the electrodes 61, 62 are indicated schematically with reference numeral 19'. Such drive means can be configured in various ways, and can include suitable bearings, motors that are directly or indirectly connected to the units, as will be appreciated by the skilled person.

In the embodiment illustrated in FIGS. 5*a*, 5*b*, (lower) parts of the (two) electrodes 61, 62 extend into (i.e. dip into, make contact with) a cooling liquid that is contained in respective first baths 64, 65. A second bath 66 relating to the third rotating unit 63 acts as a plasma fuel reservoir, i.e., the liquid contained in that bath 66 also serves as plasma fuel. During operation, the plasma fuel 66 can wet the respective rotating third unit 63. The other (first) baths 64, 65 can contain the same material as the fuel bath 66, or a different material (particularly a liquid). In the present embodiment, three different baths 64, 65, 66 are associated with the three rotating units 61, 62, 63. In an embodiment, a smaller number of baths can be provided (as is mentioned above). In the present embodiment, the liquid contained in each of the baths 64, 65 acts as a cooling medium for the respective rotating electrodes 61, 62. As discussed above, for example, the cooling baths 64, 65 can be provided with a cooling medium temperature conditioning system (not shown), for example a refrigerating system and/or a cooling medium recirculation system, to condition the temperature of the cooling medium contained in the baths, as will be appreciated by the skilled person. The fuel bath 66 associated with the rotating fuel supply unit 63 does not have to act as a cooling bath to cool that unit, or can have a lower cooling capacity than cooling capacity provided by the other bath(s) 64, 65.

The embodiment of FIGS. 5*a*, 5*b* is also provided with a high voltage electrical power source 22 that is connected to the electrodes 61, 62 via suitable high tension connecting lines 23, to induce electrical discharges Ed between the electrode 61, 62. In this embodiment, for example, the connection lines 23 are indirectly electrically coupled to the electrodes 61, 62, via the baths 64, 65, particularly via electrically conductive cooling medium (for example a liquid metal, for example tin) contained in these baths 64, 65.

Again, a fuel release 21, or fuel release inducer, such as a laser device, is provided and is configured to emit a laser beam Le to the wetted surface of the rotating fuel supply 63, to effect evaporation of the fuel from the area.

The rotating units 61, 62, 63 can each be configured and shaped in various ways. For example, each of the electrodes 61, 62 can be a rotating wheel. Each of the electrodes 61, 62 can be a rotationally symmetrical or cylindrical unit. Each electrode 61, 62 can consist of or comprise electrically conductive material, for example one or more metals. The electrodes 61, 62 can be configured and shaped similar, or different with respect to each other. In the present embodiment, the third (or inner) rotating unit 63 has smaller diameter than diameters of the electrodes 61, 62. As illustrated in FIG. 5*b*, a top of the third unit 63 is located at a level below the tops of the electrodes 61, 62. A top of the third unit 63 may be located at a level below the level of rotation axes of the electrodes 61, 62. Also, a fuel supply area that is provided by the third unit 63 is located below the level of the rotation axes of the electrodes 61, 62.

As illustrated in FIG. 5*a*, the rotation axes of the two electrodes 61, 62 extend in different directions, and the electrodes 61, 62 may be tilted with respect to opposite surfaces of the fuel supply 63, such that distances between front (electrical discharge) parts of the two electrodes 61, 62 are larger than distances between opposite (back) parts of the electrodes 61, 62. The fuel supply 63 may be arranged to position a respective fuel release area in a symmetrical relationship with respect of electrical discharge areas of the at least first and second electrode 61, 62. Particularly, to this aim, a (fuel releasing) surface (during operation) of the fuel supply 63 may be separated by the same distance from nearby edges of each of the electrodes 61, 62 (as in the drawings).

The source may be provided with one or more shields 80 (shown by a dashed rectangle in FIG. 5*a*), for example plates or other elements, to at least partly shield a fuel evaporation location (i.e. the fuel release area that is illuminated by the laser beam Le) from a downstream radiation collection field (indicated by an angle β in FIG. 5*b*). A top of the radiation collection field (which can be a cone shaped collection field, or a field having a different arrangement or shape) can coincide with a central of a radiation emission plasma RP (see FIG. 5*a*). It has been found that such a shield may be advantageous for certain applications, e.g. a position-sensitive contaminant trap 49 and the self-shading electrodes (as discussed below). Such shielding can prevent microparticles generated by the laser evaporation from traveling into the collection angle/field β.

For example, according to a non-limiting embodiment, the source system can comprise disk-shaped electrodes 61, 62 rotating through respective tin (Sn) baths 64, 65 during operation, a disk-shaped target 63 rotating through another Sn bath 66, and a laser beam Le. The target 63 and the bath 66 are preferably electrically isolated from the electrodes 61, 62 and their baths 64, 65. The target 63 and the laser beam Le can be configured in such a way that the ablated fuel reaches both electrodes 61, 62 at a desired location of discharge. This may be done symmetrically so that the vapor reaches both electrodes 61, 62 simultaneously and a 'pinch' RP may be established halfway between the electrodes 61, 62. Furthermore, the target unit 63 is preferably positioned outside the collection angle β so that it does not obstruct collectable radiation. As is mentioned before, liquid in the baths 64, 65 (used for protecting and cooling the electrodes 61, 62) does not need to be the same liquid as in fuel bath 66 (used as fuel for the source). For example, in an embodiment, the liquid in electrode baths 64, 65 may be another low-melting metal, e.g. Ga, In, Sn, Bi, Zn or an alloy of these metals.

Operation of the embodiment of FIGS. 5*a*, 5*b* can be a method to generate radiation, wherein the rotating fuel supply 63 supplies fuel (from the reservoir 66) to a respective fuel release area that is spaced-apart from the first and second electrode 61, 62. The laser beam Le defines a fuel release area on a fuel film containing surface of the rotating fuel supply unit 63, to evaporate fuel towards an electrical discharge path that extends (in a substantially straight line) between the two rotating electrodes 61, 62 (evaporated fuel is indicated by dotted clouds in the FIGS. 5*a*-8.) Then, the electrical discharge Ed between the electrodes 61, 62 generates radiation-emitting plasma RP from part of the evaporated fuel that has reached the electrical discharge path. Each of the electrodes 61, 62 may rotate (or continuously move) through a heat removing medium that is held by the respective bath 64, 65.

A high tension between the electrodes 61, 62, provided by the power source 22, ignites an electrical discharge Ed (shown by the dashed lines) between the electrodes 61, 62 via the current path, which discharge Ed produces the radiation-emitting plasma RP that emits radiation. The resulting plasma has a good symmetrical density distribution with respect to the electrodes 61, 62.

Thus, the embodiment of FIGS. 5*a*, 5*b* can provide evaporation of plasma fuel from a dedicated target 63 rather than from one of the electrodes 61, 62. For example, the dedicated target 63 can be a third disk 63 rotating through a separate liquid tin (Sn) bath.

Figure 9:
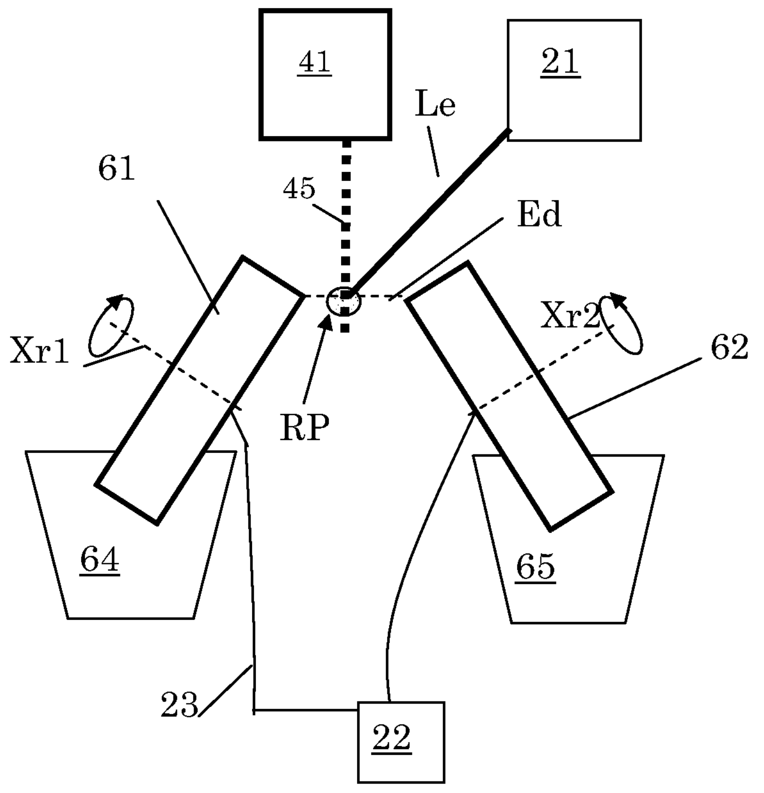
FIG. 9 schematically depicts an embodiment of a radiation source having a fuel droplet generator.

As shown in FIG. 9, the target is a tin (Sn) droplet or jet injected to reach an evaporation area that is located between the rotating electrodes 61, 62 (and that is spaced apart from each of the electrodes 61, 62). In the latter case, for example the system can be provided with a fuel evaporating system 21, 41 configured to generate the evaporated plasma fuel, wherein the evaporation system includes a fuel droplet or fuel jet generator 41 (or dispenser), and a laser 21 to at least partly evaporate the fuel that has been dispensed by the fuel droplet or fuel jet generator 41, and has reached the evaporation area. For example, the target can comprise Sn droplets 45 (preferably mass-limited) generated by a droplet generator 41 that is synchronized with the laser 21, so that the droplets 45 are evaporated at the desired location (between the rotating electrodes 61, 62, to generate the radiation-emitting plasma RP). In yet another embodiment, the target consists of a continuous jet of Sn.

The embodiment of FIGS. 5*a*, 5*b* may be used in combination with a downstream contaminant mitigation system 49 (see FIGS. 1, 2), for example a foil trap. For example, in case the contaminant trap 49 is a foil trap, certain foil spacing requirements can be relaxed so that the fuel handling can be improved and the optical transmittance can be increased significantly (typically from 60% to 90%).

The so-called protection angle (indicated by ϕ in FIG. 8) can be extended to cover the entire collection angle β, and the electrodes 61, 62 can become less susceptible to erosion. The aforementioned protection angle ϕ is associated with the (self-shading) electrodes 61, 62, and is defined by the orientation of electrode surfaces at which certain debris is generated. In certain systems (such as the system according to FIG. 7), the protection angle may be limited to fairly small values (e.g. <45°) because the fuel vapor evaporated from one electrode 111' should be directed towards the other electrode 112'. Therefore, a desired large protection angle ϕ may not be possible. The present embodiment of FIGS. 5*a*, 5*b* (see also FIG. 8), can provide an equal plasma fuel distribution viewed from the inclined edges of the electrodes 61, 62, leading to significantly larger protection angles ϕ.

Figure 6:
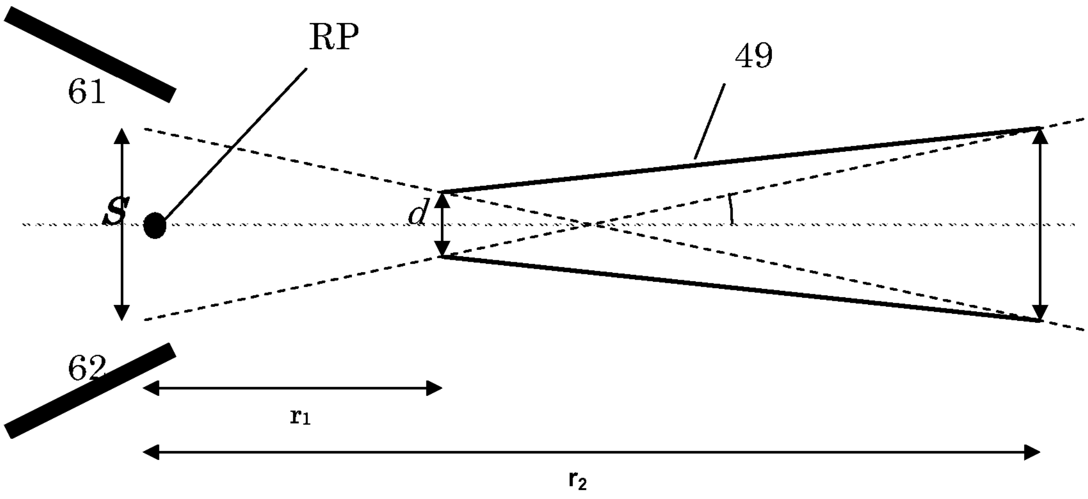
FIG. 6 shows a geometry of a contaminant trap associated with a radiation source.

The source system can be used in combination with a (position-sensitive) contaminant mitigator 49, for example a foil trap. In that case, the source pinch RP can be located in or near a center, for example centrally on a desired optical path OP, of an electrode gap (extending between nearest edges or parts of the electrodes 61, 62), as illustrated in FIG. 6, rather than close to one of the electrodes. Thus, the spacing between the pinch RP and the debris emitting surfaces of the electrodes 61, 62 increases. This allows for a larger spacing of contaminant mitigation foils of a downstream foil trap 49 (located concentrically with respect to the optical path OP), resulting in improved optical transmission and improved source fuel handling. For example, according to a non-limiting embodiment, typically, a filter width (s in FIG. 6) can be increased to a relatively high value (for example a value higher than 1 mm) The filter width s can be related to foil trap dimensions and source arrangement by $$s = \frac{2r_2}{r_2 - r_1}d$$

wherein r1 is the distance measured along the optical axis between the pinch RP and an upstream foil trap end, r2 is the distance measured along the optical axis between the pinch RP and a downstream foil trap end, and d is the foil spacing at the upstream foil trap end (measured normally with respect of the optical axis) Thus, the spacing of the foils is proportional to the filter width. Therefore, when the filter width is increased by a factor of 4, so is the foil spacing, and hence the optical losses on the front of the foils are reduced by a factor of 4. For example, in a typical configuration, the optical transmittance may be increased from about 60% to more than 90%.

Figure 8:
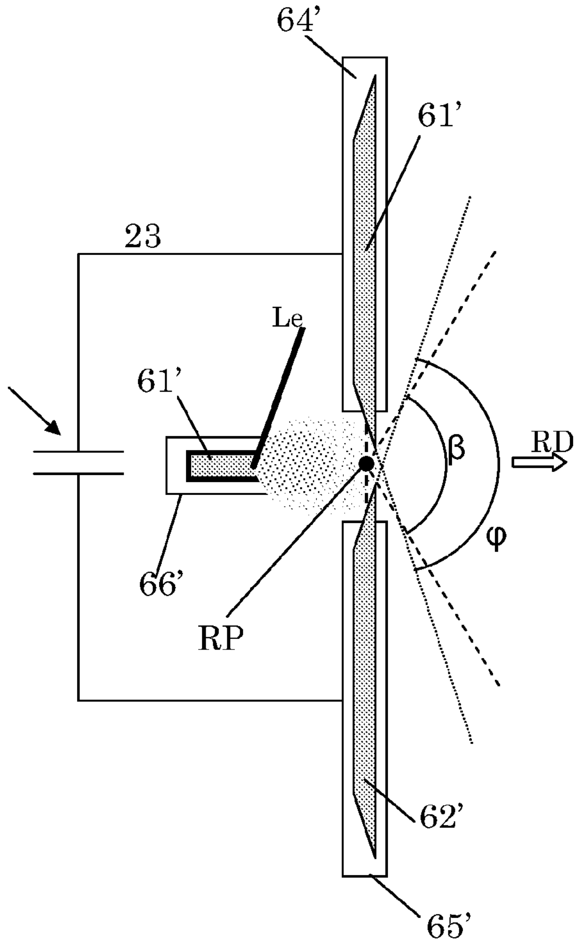
FIG. 8 schematically shows self-shading of an embodiment of a radiation source.

FIG. 8 shows an embodiment, similar to the embodiment of FIGS. 5*a*, 5*b*. The FIG. 8 embodiment is provided with two rotating electrodes 61', 62' and respective baths 64', 65'. In this case, each electrode 61', 62' has a sharply inclined edge, each electrode 61', 62' for example being positioned vertically, and being in mutual alignment (next to one another). In this embodiment the electrodes 61', 62' are self-shading. In addition, in the embodiment of FIG. 8, the source comprises a dedicated rotating target unit 63' having a respective fuel bath 66'. Fuel vapor, emanating from the target unit 63' reaches both electrodes 61', 62' during operation. In the FIG. 8 embodiment, the protection angle ϕ can be so large as to span the entire collection angle β. An additional advantage of this configuration is that it makes the self-shading electrodes 61', 62' less susceptible to erosion. For example, in the FIG. 7 embodiment, electrical discharge takes place near the sharp corner of the electrodes 14' 15', because of the small electrode gap and the high electric field. Consequently, the corner becomes blunt over the course of time, which may deteriorate the performance of the electrodes 14' 15' in terms of debris suppression. In the FIG. 8 embodiment, the position of the discharge on the electrode surface can be better controlled and thus can be arranged to be further away from the sharp corner.

Thus, embodiments of the present invention can provide a specific (preferably symmetric) plasma density distribution, particularly with rotating disk electrodes that rotate through a liquid fuel bath. The present invention can lead to "relaxed" filter distance requirement in case of application of a position-sensitive debris mitigation device 49, and can provide an increase of the protection angle in case of application of the self-shading electrodes.

Although specific reference may be made in this text to the use of lithographic apparatus in the manufacture of ICs, it should be understood that the lithographic apparatus described herein may have other applications, such as the manufacture of integrated optical systems, guidance and detection patterns for magnetic domain memories, flat-panel displays, liquid-crystal displays (LCDs), thin-film magnetic heads, etc.

Although specific reference may have been made above to the use of embodiments of the invention in the context of optical lithography, it will be appreciated that the invention may be used in other applications, for example imprint lithography, and where the context allows, is not limited to optical lithography.

The terms "radiation" and "beam" used herein encompass all types of electromagnetic radiation, including ultraviolet (UV) radiation (e.g. having a wavelength of or about 365, 355, 248, 193, 157 or 126 nm) and extreme ultra-violet (EUV) radiation (e.g. having a wavelength in the range of 5-20 nm), as well as particle beams, such as ion beams or electron beams.

While specific embodiments of the invention have been described above, it will be appreciated that the invention may be practiced otherwise than as described. For example, the invention may take the form of a computer program containing one or more sequences of machine-readable instructions describing a method as disclosed above, or a data storage medium (e.g. semiconductor memory, magnetic or optical disk) having such a computer program stored therein.

The descriptions above are intended to be illustrative, not limiting. Thus, it will be apparent to one skilled in the art that modifications may be made to the invention as described without departing from the scope of the claims set out below.

What is claimed is:

1. A radiation source configured to generate radiation, comprising:

- a first electrode and a second electrode configured to produce an electrical discharge during use to generate radiation-emitting plasma from a plasma fuel;
- a fuel supply configured to supply a plasma fuel to a fuel release area that is associated with the first electrode and the second electrode; and
- a fuel release configured to induce release of fuel, supplied by the fuel supply, from the fuel release area, the fuel release area being spaced-apart from the first electrode and from the second electrode, wherein the first electrode and the second electrode form anodes and the fuel supply is an electrical discharge cathode, or wherein the first electrode and the second electrode form cathodes and the fuel supply is an electrical discharge anode.

2. The source according to claim 1, further comprising a drive configured to rotate the first electrode or the second electrode or the fuel supply, or any combination thereof.

3. The source according to claim 2, wherein the drive is configured to rotate the first electrode and the second electrode.

4. The source according to claim 1, wherein the fuel supply comprises or is part of a fuel transport system configured to transport fuel from a fuel reservoir to the fuel release area.

5. The source according to claim 4, wherein the fuel transport system is configured to transport fuel from the fuel reservoir to the fuel release by way of rotation.

6. The source according to claim 1, wherein the fuel supply is not part of the first electrode or the second electrode, wherein the fuel supply is preferably not part of any of the first electrode and the second electrode.

7. The source according to claim 6, wherein the fuel supply is configured to position the fuel release area in a symmetrical relationship with respect to the electrical discharge area of the first electrode and the second electrode.

8. The source according to claim 1, further comprising a first cooling bath to cool the first electrode or the second electrode or the fuel supply, or any combination thereof.

9. The source according to claim 1, wherein the fuel supply is a rotating wheel, or is a rotationally symmetrical or cylindrical fuel supplying unit, or is connected to a high voltage electrical power source, or any combination thereof.

10. A method to generate radiation, comprising:

- providing a first electrode and a second electrode;
- transporting fuel to a fuel release area that is spaced-apart from the first electrode and the second electrode with a fuel supply;
- inducing release of the fuel from the fuel release area towards an electrical discharge path associated with the first electrode and the second electrode; and
- generating an electrical discharge to generate radiation-emitting plasma from fuel that has been released from the fuel release area, wherein the fuel supply is a third electrode, wherein electrical discharges are evoked between each of the first and second electrode on one hand and the third electrode on the other hand.

11. The method according to claim 10, wherein the electrical discharge is being generated between the first and second electrode, and not via the fuel supply.

12. The method according to claim 10, including positioning the electrodes relative to each other so that, in use, discharge paths extending between the electrodes are substantially curved so as to create a force that compresses the radiation-emitting plasma.

13. The method according to claim 10, including positioning the electrodes relative to each other so that, in use, discharge paths extending between the electrodes are substantially along a straight line.

14. The method according to claim 10, wherein at least part of at least one of the electrodes is rotating or continuously moving through a heat removing medium.

15. The method according to claim 10, wherein the fuel supply is rotating or continuously moving through a heat removing medium.

16. A lithographic apparatus comprising:

- a radiation source configured to generate radiation, the radiation source comprising
  - a first electrode and a second electrode configured to produce an electrical discharge during use to generate radiation-emitting plasma from a plasma fuel, a fuel supply configured to supply a plasma fuel to a fuel release area that is associated with the first electrode and the second electrode, and a fuel release configured to induce release of fuel, supplied by the fuel supply, from the fuel release area, the fuel release area being spaced-apart from the first electrode and from the second electrode, wherein the first electrode and the second electrode form anodes and the fuel supply is an electrical discharge cathode, or wherein the first electrode and the second electrode form cathodes and the fuel supply is an electrical discharge anode;

a patterning device configured to pattern the radiation; and a projection system configured to project the patterned radiation onto a target portion of a substrate.

* * * * *